United States Patent [19]

Rediker, Jr.

[11] Patent Number: 5,323,665

[45] Date of Patent: Jun. 28, 1994

[54] STARTING VIBRATION DAMPED FLEXPLATE FLYWHEEL

[75] Inventor: Frank J. Rediker, Jr., Sterling Heights, Mich.

[73] Assignee: General Motors Corporation, Detroit, Mich.

[21] Appl. No.: 93,564

[22] Filed: Jul. 19, 1993

[51] Int. Cl.⁵ .......................... F16D 3/66; F16F 15/12
[52] U.S. Cl. .................................. 74/574; 74/572; 464/68; 192/106.2
[58] Field of Search ............... 74/572, 574; 464/24, 464/68; 192/106.2, 70.18

[56] References Cited

U.S. PATENT DOCUMENTS

| | | | |
|---|---|---|---|
| 4,462,269 | 7/1984 | Inglis | 74/572 |
| 5,062,517 | 11/1991 | Muchmore et al. | 192/106.2 |
| 5,105,680 | 4/1992 | Naudin | 74/574 |
| 5,111,714 | 5/1992 | Honoki et al. | 74/574 |
| 5,123,877 | 6/1992 | Maucher et al. | 464/68 |
| 5,156,249 | 10/1992 | Friedmann | 192/106.2 |
| 5,180,335 | 1/1993 | Maucher et al. | 74/574 X |
| 5,194,044 | 3/1993 | Jackel et al. | 464/24 |
| 5,195,621 | 3/1993 | Dull et al. | 192/3.29 |
| 5,203,835 | 4/1993 | Kohno et al. | 192/3.29 |

FOREIGN PATENT DOCUMENTS 307921 10/1929 United Kingdom ................... 74/574

Primary Examiner—Vinh T. Luong
Attorney, Agent, or Firm—Charles K. Veenstra

[57] ABSTRACT

A flexplate flywheel has an annular damper ring welded directly to the associated ring gear to substantially reduce starter associated vibrations and the level of sound perceived by the driver of an associated automotive vehicle during engine starting.

7 Claims, 7 Drawing Sheets

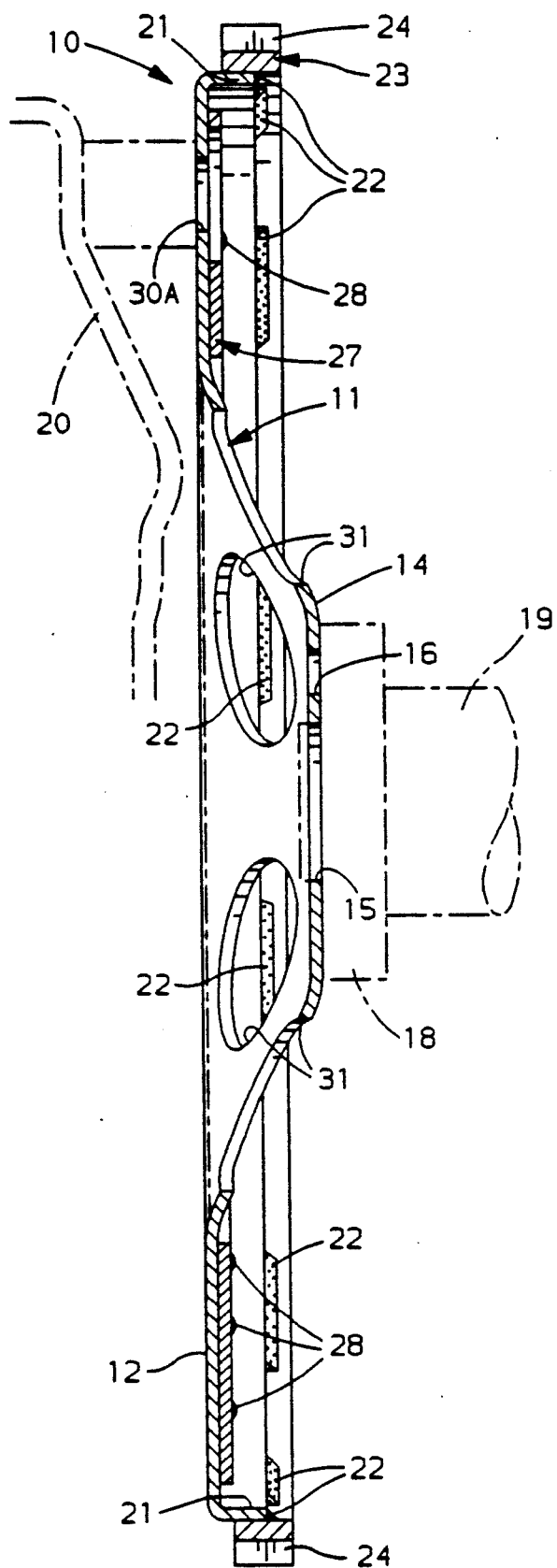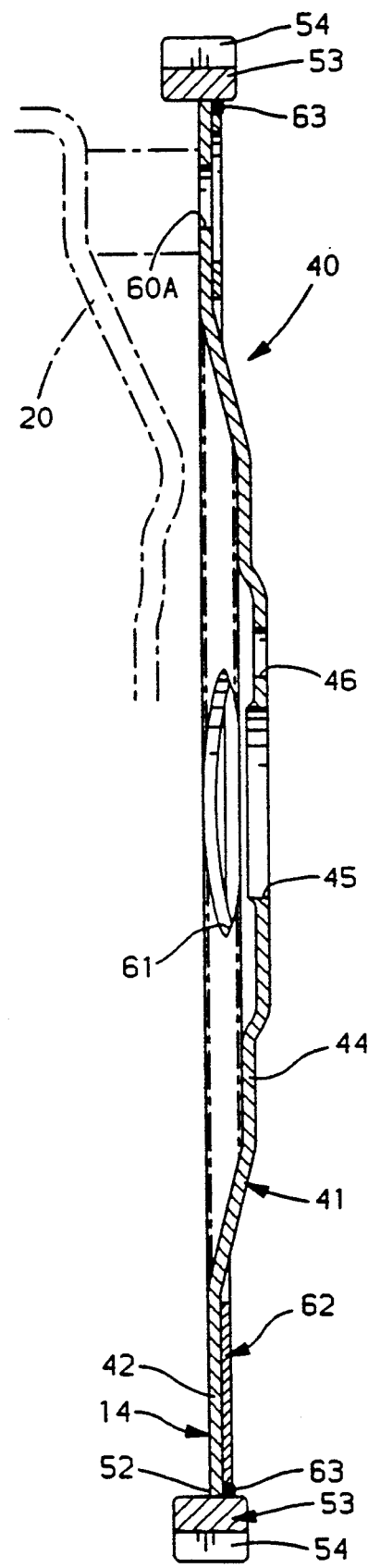
PRIOR ART
FIG. 2
FIG. 4

STARTING VIBRATION DAMPED FLEXPLATE FLYWHEEL

TECHNICAL FIELD

This invention relates to flywheels for automotive engines and the like. More particularly, the invention relates to sound generating vibration damping means for reducing or modifying sound transmitted to flexplate flywheels and possibly to associated components to reduce starting noise.

BACKGROUND

It is known in the art relating to flexplate engine flywheels to provide a thin annular ring fixed as by projection welding to the flexplate inwardly of an associated starter ring gear to reduce engine generated flexplate vibrations that may result in undesirable sound transmitted from the flywheel and/or engine. One such prior art arrangement which has been used commercially in automobiles for connecting the engine with a transmission is shown in FIGS. 1 and 2.

In these Figures, numeral 10 indicates the prior art flywheel which comprises a circular disc 11 of rotatably stiff but axially flexible relatively thin sheet metal. The disc 11 is of generally constant axial thickness although variable thickness discs could be provided if desired. The disc 11 has a generally flat outer annulus 12 contacted with a slightly dished central portion 14 having a central guide opening 15 surrounded by a plurality of smaller openings 16 for attaching the disc 11 to a flanged end 18 of an engine crankshaft 19. The degree of dishing is optional and depends primarily upon the space available between the crankshaft 19 and an associated transmission input member such as a fluid coupling 20.

Beyond the outer annulus 12, the disc 11 has a short axial flange 21 to which is intermittently welded at 22 a steel ring gear 23 having outwardly facing teeth 24 adapted to be engaged by a starter drive gear 26 for starting the engine. (Some prior art arrangements omit the flange 21 and weld the ring gear directly to the flat outer annulus 12 of the disc.)

Between the flange 21 and the central portion 14 a damping ring 27 formed as a thin generally flat annulus is fixed at radially and annularly spaced locations 28 by projection welding or the like to the flat outer annulus 12. Annularly spaced mounting openings 30 extend through the outer annulus 12 and damping ring 27. One opening 30A may be nonround for balancing alignment of the engine and transmission upon assembly. Additional openings 31 may be provided through the disc 11 for controlling its stiffness and lightening the flywheel 10.

The prior arrangement as described for FIGS. 1 and 2 has been effective in reducing or altering engine generated sound vibrations to provide quieter or more pleasing engine and vehicle noise transmission within and outside the vehicle. However, a further reduction in starter drive generated noise to obtain an improved perception of transmitted sound was also desired.

SUMMARY OF THE INVENTION

The present invention provides an improved flexplate flywheel construction which advantageously reduces both the vibration level or sound power and the effective frequency of transmitted sound caused by engine starter induced vibrations during engine starting. The improved structure differs substantially from the prior art in providing direct welding, preferably continuous, of the ring gear to a damping ring to directly reduce ring gear transmitted starting induced vibrations.

This modification is preferably accomplished by connecting the flat outer annulus directly and preferably continuously by welding to the ring gear. However, it is believed that intermittent welding of the damping ring to ring gear will provide some reduction of starting noise.

It is not required to also spot weld the damping ring to the flexplate but, in a preferred embodiment, the outer edge of the flexplate central portion and the outer edge of the damping ring are both welded to an annular inner face of the ring gear by the same continuous welding bead, simplifying manufacturing.

These and other features and advantages of the invention will be more fully understood from the following description of certain specific embodiments of the invention taken together with the accompanying drawings.

BRIEF DRAWING DESCRIPTION

In the drawings:

FIG. 2 is a cross-sectional view from the line 2—2 of FIG. 1;

FIG. 4 is a cross-sectional view from the line 4—4 of FIG. 3;

DETAILED DESCRIPTION

Figure 3:
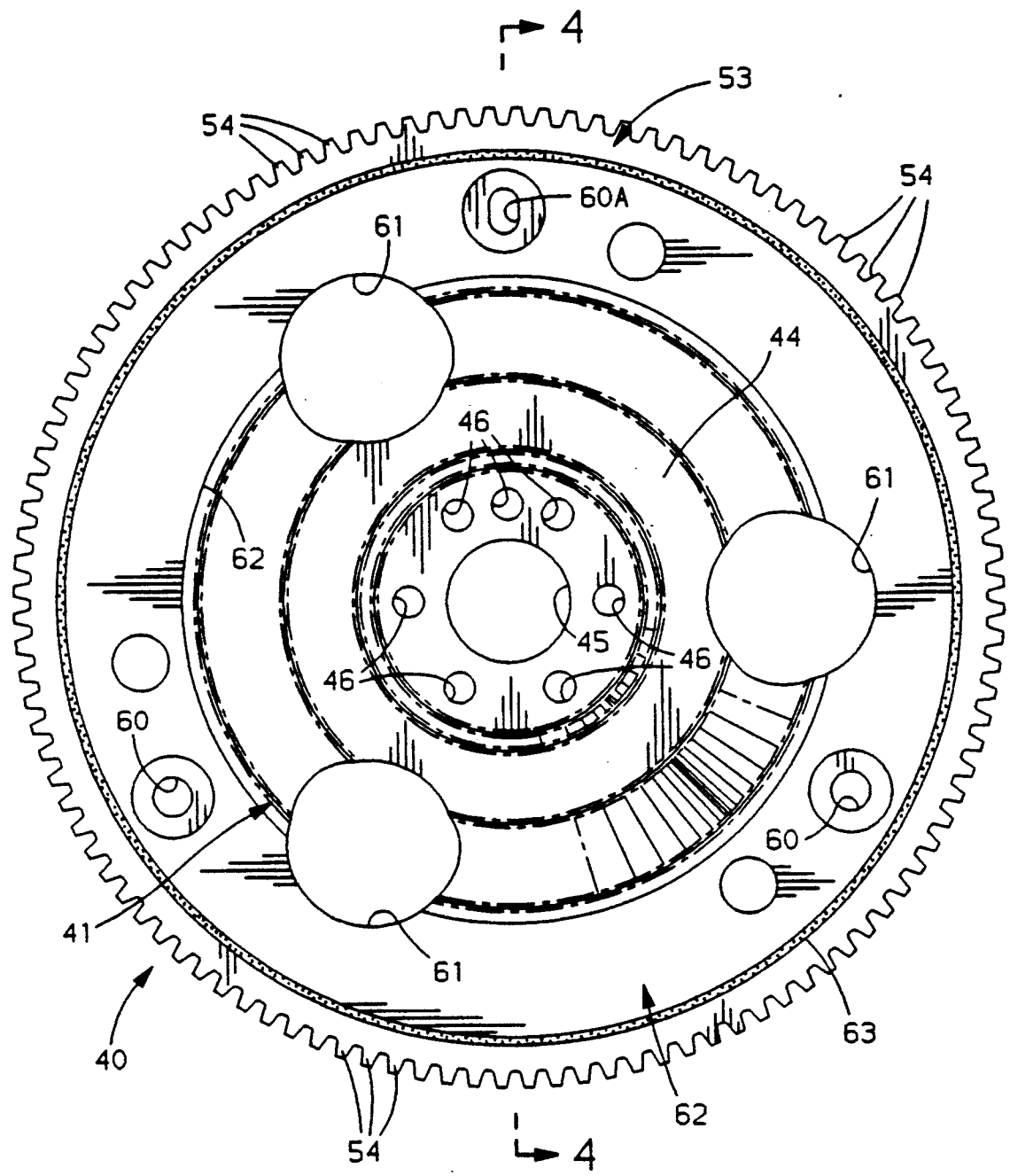
FIG. 3 is a face view of a flexplate flywheel according to the invention.

Referring now to the drawings in detail, FIGS. 3–4 show an embodiment of modified flexplate flywheel 40 having starting vibration damping means according to the invention. The flywheel has several features similar to those previously described for the prior art. These include a circular disc 41 with a flat outer annulus 42 and slightly dished central portion 44 with a central guide opening 45 surrounded by smaller openings 46 for attaching to the end 18 of a crankshaft 19 (not shown in these figures).

Figure 1:
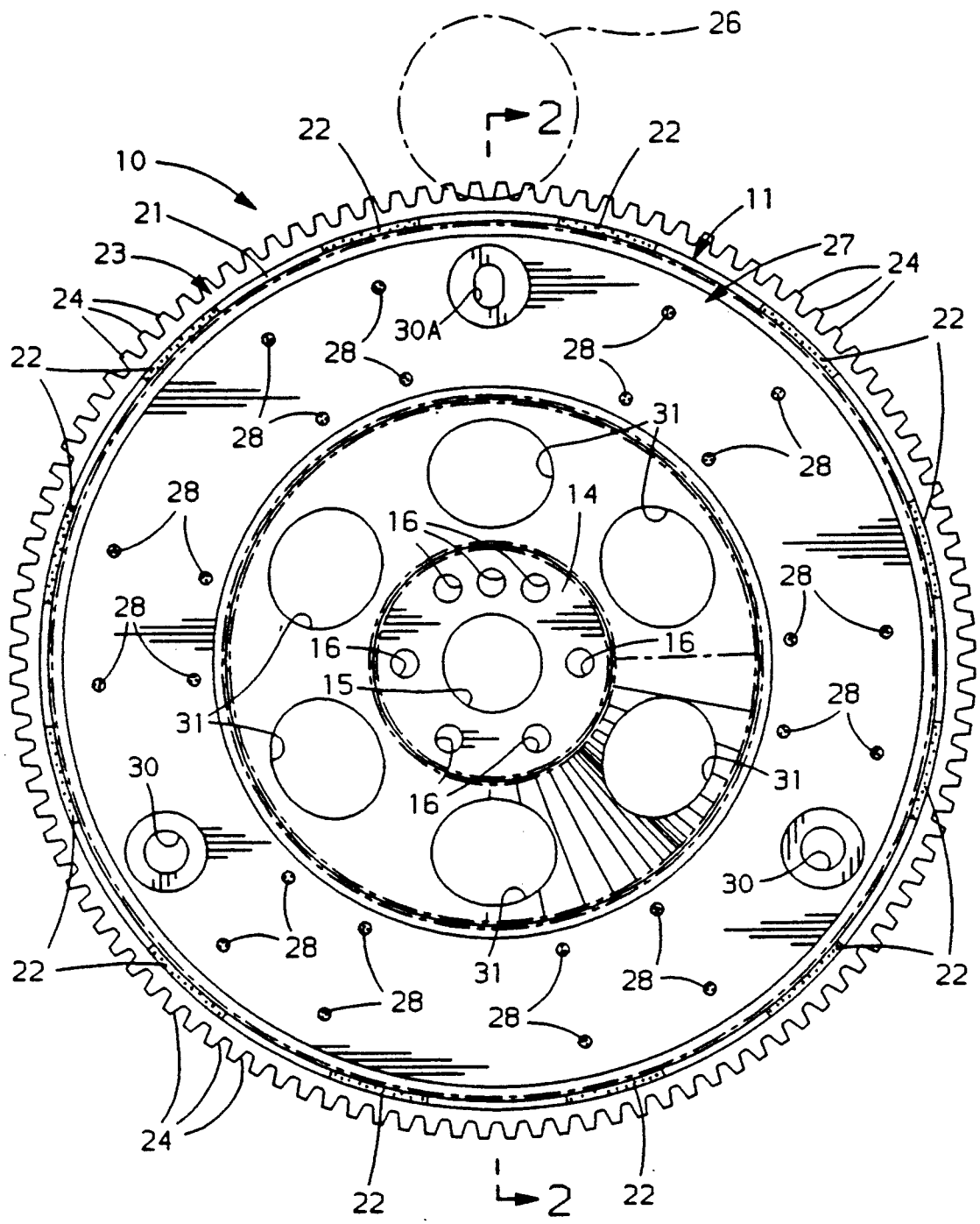
FIG. 1 is a face view of a prior art flexplate flywheel.

The outer annulus 42 of the disc 41 has a radial outer edge 52 to which is welded a steel ring gear 53 with teeth 54 for engaging a starter drive gear 26 (FIG. 1) Mounting openings 60 are provided, one of which 60A is nonround, for attaching the outer annulus to a transmission fluid coupling 20 or the like. Openings 61 may also be provided in the disc 41. These items are similar to the prior art.

The flywheel 40 also has a flat annular damping ring 62 mounted against the face of the outer annulus 42. It differs significantly from the prior art in that it is welded directly to the ring gear 53 by a continuous weld bead 63. While a continuous bead is preferred, an intermittent welding pattern may also be acceptable. Preferably, a single weld 63 is used to connect the ring gear 53 to both the damping ring 62 and the outer edge 52 of the disc 41 because this simplifies assembly and minimizes weight. Optionally, the disc and damping ring could be connected to the ring gear by separate welds. Also the disc and damping ring could additionally be projection welded together as long as both are also welded to the ring gear.

The result of this change wherein the ring gear is welded directly to the damping ring is to significantly enhance the damping of ring gear vibrations which are caused by gear rotation during engine starting. Evidence of this is seen in FIGS. 5a, 5b, 6a and 6b which compare the results of tests made on (1) an undamped flywheel, (2) one having a flexplate mounted damper as in the prior art and (3) a damper according to the invention.

Figure 5A:
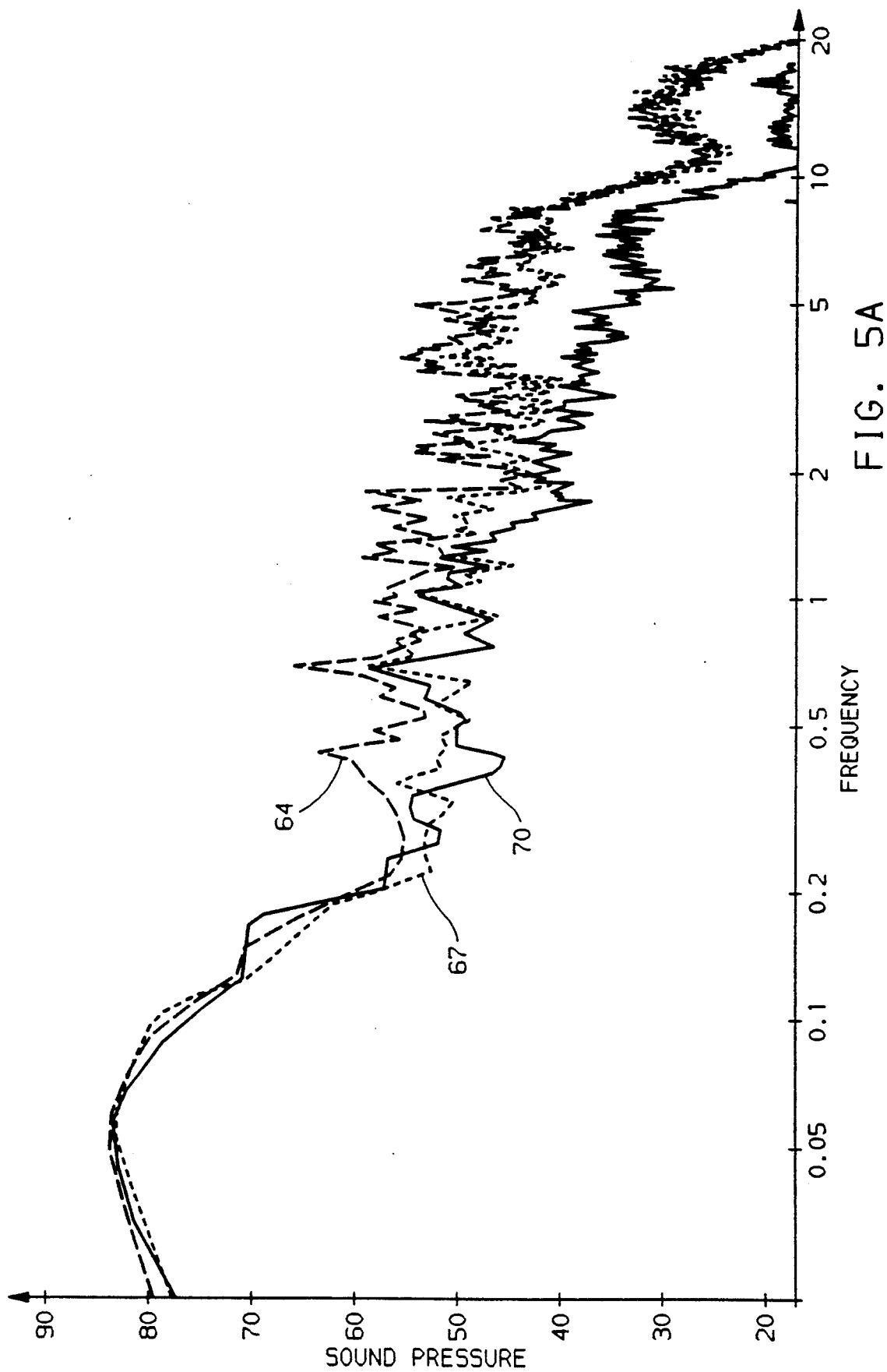
FIGS. 5a and 5b are graphs comparing frequency vs sound pressure of prior and current devices.
Figure 5B:
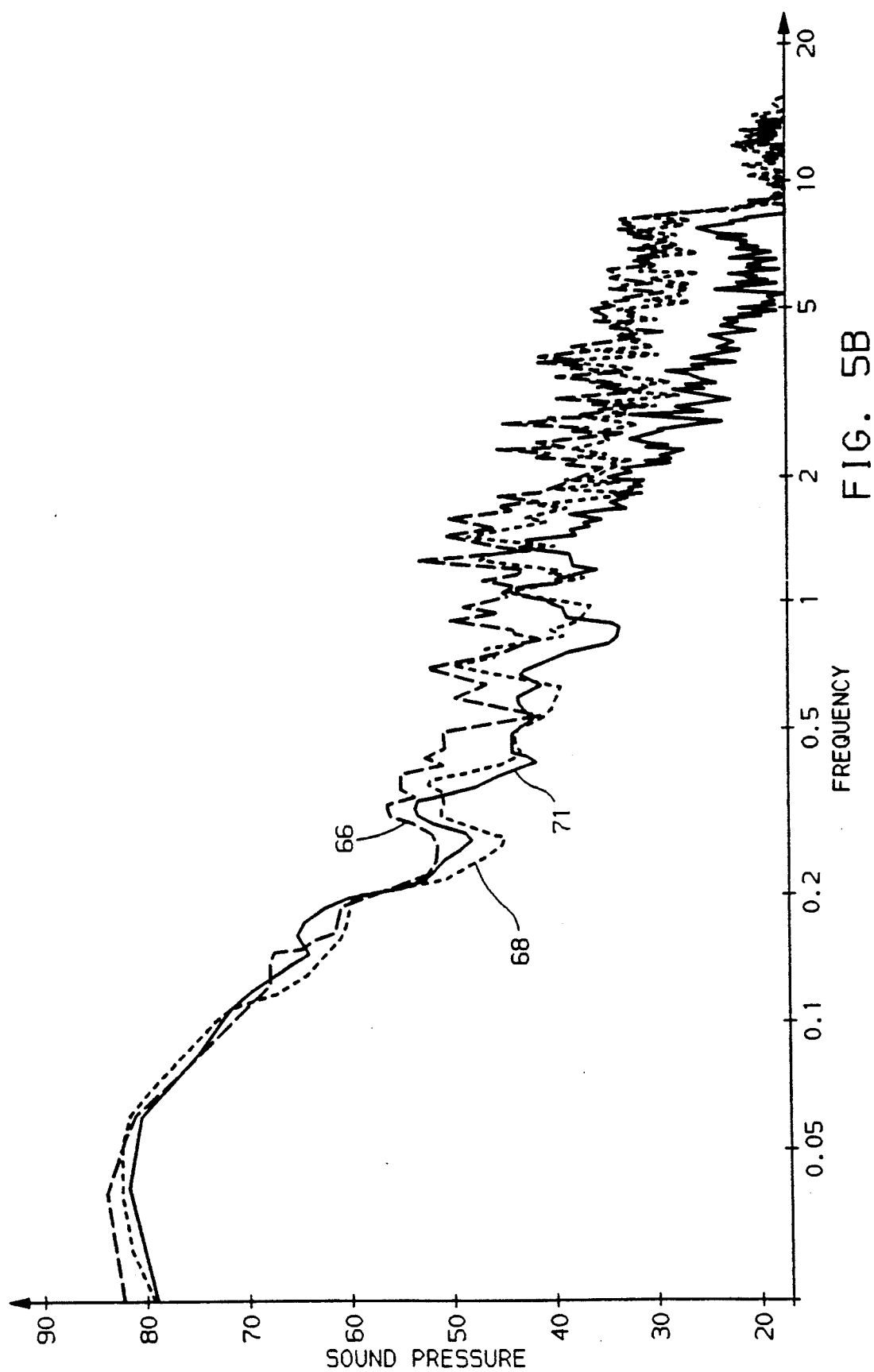

FIGS. 5a and 5b compare the sound pressure across the frequency spectrum of sound readings at left and right ear positions inside a vehicle. Long dashed lines 64, 66 show the results for an undamped flexplate flywheel. Short dashed lines 67, 68 represent a prior art flywheel with damped flexplate and solid lines 70, 71 show a flywheel with damped ring gear according to the invention. The left ear results are in general greater than those of the right ear.

Figure 6A:
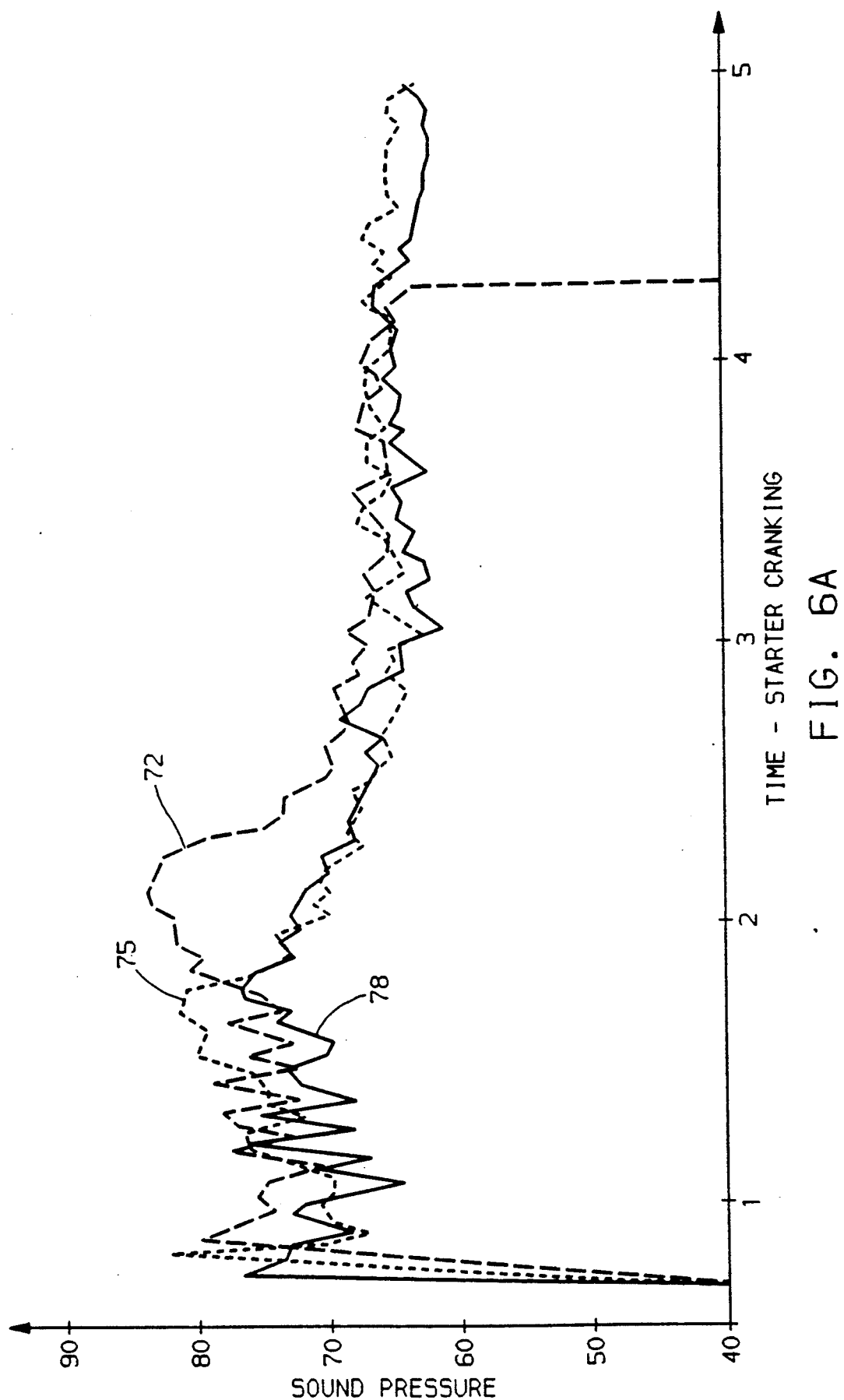
FIG. 6a and 6b are graphs comparing time during starting vs overall sound pressure for the same devices.
Figure 6B:
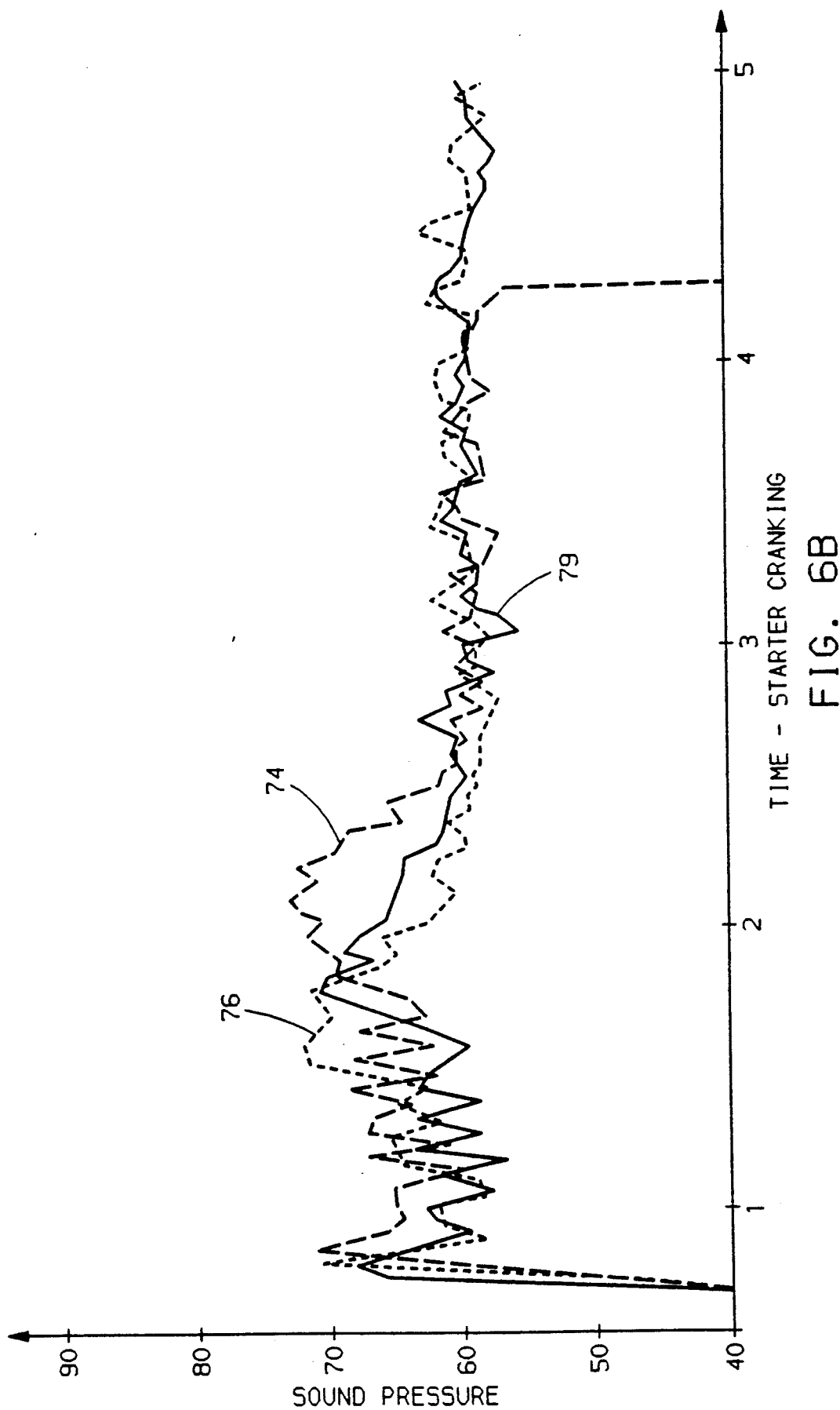

FIGS. 6a and 6b compare total sound pressure at similar left and right ear positions over a time period of seconds, indicated, of starter cranking. Again the left ear results are greater. Long dashed lines 72, 74 show the undamped flywheel, short dashed lines 75, 76 show the damped flexplate and solid lines 78, 79 show the damped ring gear of the invention.

While the invention has been described by reference to a preferred embodiment, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. A vibration damped flywheel comprising
a circular disc of stiff but flexible sheet metal forming a flex plate,
an annular ring gear rigidly fixed to the outer periphery of the disc, and
a damping ring formed as a thin generally flat annulus lying against an outer portion of the disc and having an outer edge welded to the ring gear.

2. A vibration damped flywheel comprising,
a circular disc of stiff but flexible sheet metal forming a flex plate,
an annular ring gear rigidly fixed to the outer periphery of the disc, the ring gear including peripheral teeth for engagement by an engine starter drive, and
a damping ring formed as a thin generally flat annulus lying against an outer portion of the disc and having an outer edge welded to the ring gear for damping starter drive induced vibrations during starting of an associated engine.

3. The invention as in claim 2 wherein the damping ring is fixed to the ring gear by a continuous weld.

4. The invention as in claim 2 wherein the ring gear is fixed to the flex plate by a continuous annular weld and the damping ring is fixed to the ring gear by welding along the periphery of the damping ring.

5. The invention as in claim 4 wherein the damping ring is fixed to the ring gear by a continuous weld.

6. The invention as in claim 5 wherein the flex plate and the damping ring are both fixed to the ring gear by the same weld.

7. The invention as in claim 2 wherein the flex plate and the damping ring are both fixed to the ring gear by the same weld.

* * * * *